United States Patent
Wu (10) Patent No.: US 9,720,508 B2
(45) Date of Patent: Aug. 1, 2017

(54) SYSTEM FOR CONTROLLING A PLURALITY OF CAMERAS IN A DEVICE

(75) Inventor: Lin-Na Wu, Beijing (CN)

(73) Assignee: Google Technology Holdings LLC, Mountain View, CA (US)

( * ) Notice: Subject to any disclaimer, the term of this patent is extended or adjusted under 35 U.S.C. 154(b) by 119 days.

(21) Appl. No.: 14/424,544

(22) PCT Filed: Aug. 30, 2012

(86) PCT No.: PCT/CN2012/080798
§ 371 (c)(1),
(2), (4) Date: Feb. 27, 2015

(87) PCT Pub. No.: WO2014/032259
PCT Pub. Date: Mar. 6, 2014

(65) Prior Publication Data
US 2015/0205363 A1    Jul. 23, 2015

(51) Int. Cl.
*G09G 5/00* (2006.01)
*G06F 3/01* (2006.01)
*H04N 5/232* (2006.01)
*G02B 13/00* (2006.01)
*G06T 7/00* (2017.01)
*H04N 5/262* (2006.01)
*H04N 5/225* (2006.01)

(52) U.S. Cl.
CPC ......... *G06F 3/017* (2013.01); *G02B 13/0015* (2013.01); *G06T 7/00* (2013.01); *H04N 5/232* (2013.01); *H04N 5/23219* (2013.01); *H04N 5/262* (2013.01); *H04N 5/2257* (2013.01)

(58) Field of Classification Search
CPC ....... G06F 3/017; G02B 13/0015; G06T 7/00; H04N 5/232; H04N 5/23719; H04N 5/262; H04N 5/2257
USPC ......................................................... 345/156
See application file for complete search history.

(56) References Cited

U.S. PATENT DOCUMENTS

| | | | |
|---|---|---|---|
| 7,582,871 B2 | 9/2009 | Tadano | |
| 8,199,212 B2 | 6/2012 | Nonaka et al. | |
| 2002/0118286 A1* | 8/2002 | Kanade | H04N 5/222 348/222.1 |
| 2005/0270368 A1 | 12/2005 | Hashimoto | |
| 2008/0013789 A1* | 1/2008 | Shima | G06K 9/00798 382/104 |

(Continued)

FOREIGN PATENT DOCUMENTS

| | | |
|---|---|---|
| CN | 101335833 A | 12/2008 |
| CN | 101572775 A | 11/2009 |
| JP | 2008-187700 A | 8/2008 |

OTHER PUBLICATIONS

State Intellectual Property Office of the People's Republic of China, International Search Report and Written Opinion for PCT Application No. PCT/CN2012/080798 (related to above-captioned patent application), mailed Jun. 13, 2013.

*Primary Examiner* — Mark Regn (57) ABSTRACT

A method of operating a device having at least two camera lenses includes inputting a first image via a first camera lens, and detecting a control gesture from image processing of the first image. The method further includes controlling an operation associated with processing an image input from a second camera lens in response to the detected gesture from the first image.

10 Claims, 8 Drawing Sheets

(56) References Cited

U.S. PATENT DOCUMENTS

2009/0273688 A1* 11/2009 Nonaka ................ H04N 5/2259
                                                      348/222.1
2013/0335573 A1* 12/2013 Forutanpour ........... G06F 3/011
                                                      348/158

* cited by examiner

SYSTEM FOR CONTROLLING A PLURALITY OF CAMERAS IN A DEVICE

TECHNICAL FIELD

The technical field relates to a system for controlling a plurality of cameras in a device.

BACKGROUND

People use mobile phones throughout the world to communicate with each other. Specifically, people utilize mobile phones for texting, speaking to each other, accessing websites and transferring digital media content. Digital media content includes pictures, video, text and documents.

A person utilizes his mobile phone to take pictures of objects or things by utilizing the phone's camera. In fact, more often than not cameras in mobile phones are replacing the utilization of stand-alone cameras. Since cameras in phones have become popular, the images produced by these cameras are equivalent to many very expensive stand-alone cameras. Some consumers have started to toss out or leave behind their stand-alone camera because they only utilize their camera phones, which they may have upon their person more regularly. Even though cameras in phones are well-developed and sophisticated cameras, these mobile phone cameras can be further improved upon.

BRIEF DESCRIPTION OF THE DRAWINGS

These and other advantages of one or more embodiments will become more apparent as the following description is read in conjunction with the accompanying drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of disclosed example embodiments.

The apparatus and method components have been represented whereby conventional symbols in the drawings, showing only those specific details that are pertinent to understanding the example embodiments, so as not to obscure the disclosure with details that will be readily apparent to those of ordinary skill in the art having the benefit of the description herein.

DETAILED DESCRIPTION OF THE INVENTION

One or more embodiments are described with reference to the drawings, where like components are identified with the same numerals. The descriptions of the one or more embodiments and/or arrangements are not intended to limit the scope of the disclosure.

Figure 1:
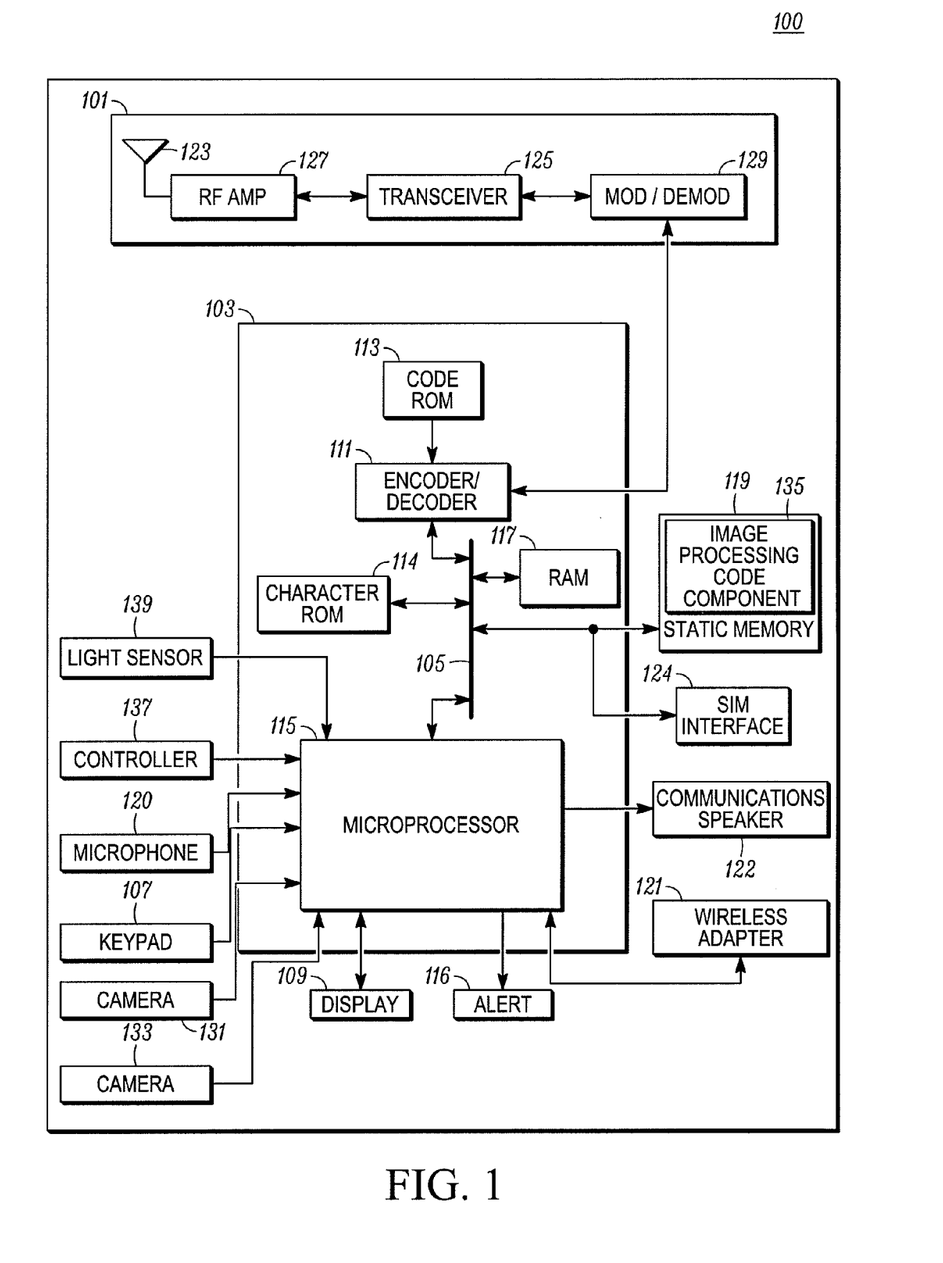
FIG. 1 is a schematic diagram of a mobile device.

FIG. 1 is a schematic diagram of a mobile device. Mobile device 100 includes a radio frequency communication unit 101 coupled to be in communication with a common data and address bus 105 of a processor 103. The mobile device 100 also has a keypad 107, a display screen 109, such as a touch screen, coupled to be in communication with the processor 103. In another embodiment of this invention, mobile device 100 may be a gaming computer, laptop computer, smartphone, notebook computer, mobile computer, tablet computer or any other type of portable computer system.

Processor 103 includes an encoder/decoder 111 and a Read Only Memory (ROM) 113 for storing data, including encoded and decoded voice data or other data that may be transmitted or received by the mobile device 100. The processor 103 further includes a microprocessor 115 coupled, by the command data and address bus 105, for communication with the following components: encoder/decoder 111, a character Read Only Memory (ROM) 113, a Random Access Memory (RAM) 117, programmable memory 119 and a subscriber Identity Module (SIM) interface 124. The programmable memory 119 and SIM interface 124 each can store, among other things, selected text messages and a Telephone Number Database (TND) comprising a number field for telephone numbers and a name field for identifiers associated with one of the numbers in the name field.

Radio frequency communications unit 101 is a combined receiver and transmitter having a common antenna 123. The communications unit 101 has a transceiver 125 coupled to the antenna 123 via a radio frequency amplifier 127. The transceiver 125 is also coupled to a combined modulator/demodulator 129 that is coupled to the encoder/decoder 111.

Microprocessor 115 has ports for coupling to the keypad 107, to the display screen 109, to a first camera 131, to a second camera 133, to a controller 137 and to a light sensor 139. The microprocessor 115 further has ports for coupling to an alert module 116 that typically contains an alert speaker, vibrator motor and associated drivers, to a wireless peripheral adapter 121 such as Bluetooth® adapter, to a microphone 120 and to a communications speaker 122. Wireless peripheral adapter 121 may be communicatively coupled to, for example, a wireless fidelity (Wi-Fi) network within a local access network (LAN) or Wide area network (WAN), or a virtual area network. Wireless peripheral adapter may also be communicatively coupled to a Bluetooth network or device or a near field communication (NFC) module or any network that can facilitate the transfer of information between computer systems, for example, a Digital Living Network Alliance (DLNA) digital network.

The character ROM 114 stores code for decoding or encoding data such as text messages that may be received by the communications unit 101. In some embodiments of the present invention, the character ROM 114, the programmable memory 119, or a SIM also can store operating code (OC) for the microprocessor 115 and code for performing functions associated with the mobile device 100. For example, the programmable memory 119 can comprise computer readable program code components 135 configured to cause execution of a method for controlling a plurality of cameras in the mobile device 100, according to an embodiment of the present invention. Controller 137 is coupled to the microprocessor 115 where the controller 137 controls the operation of camera 131 and camera 133. Light sensor 139 is coupled to the microprocessor 115 where the light sensor 139 measures intensity of light entering an aperture or opening for camera 131 and camera 133. The measured light intensity levels are analyzed by microprocessor 115.

Figure 2A:
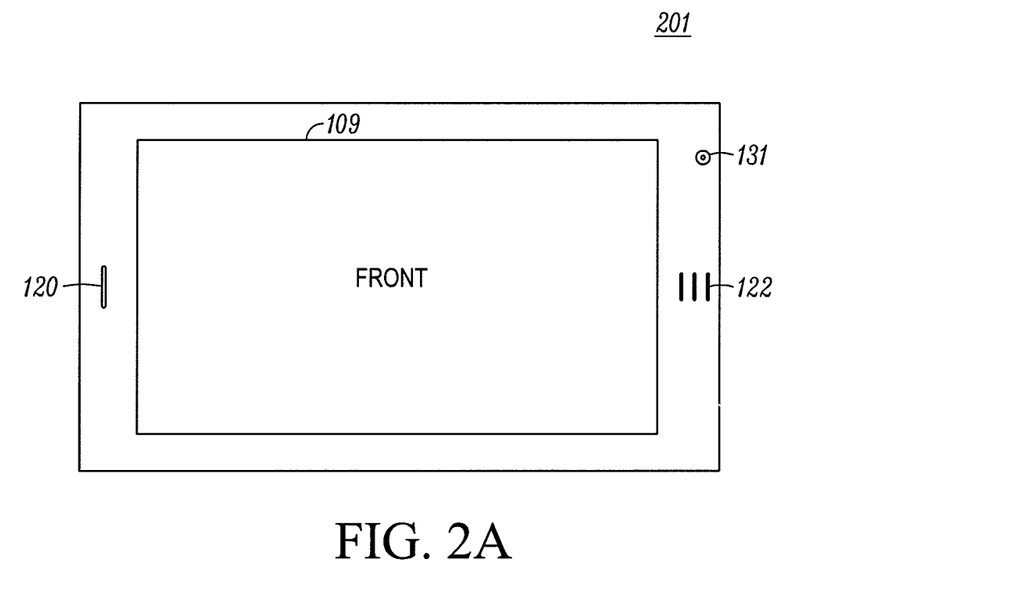
FIG. 2A is an example illustration of a front side of the mobile device of FIG. 1.
Figure 2B:
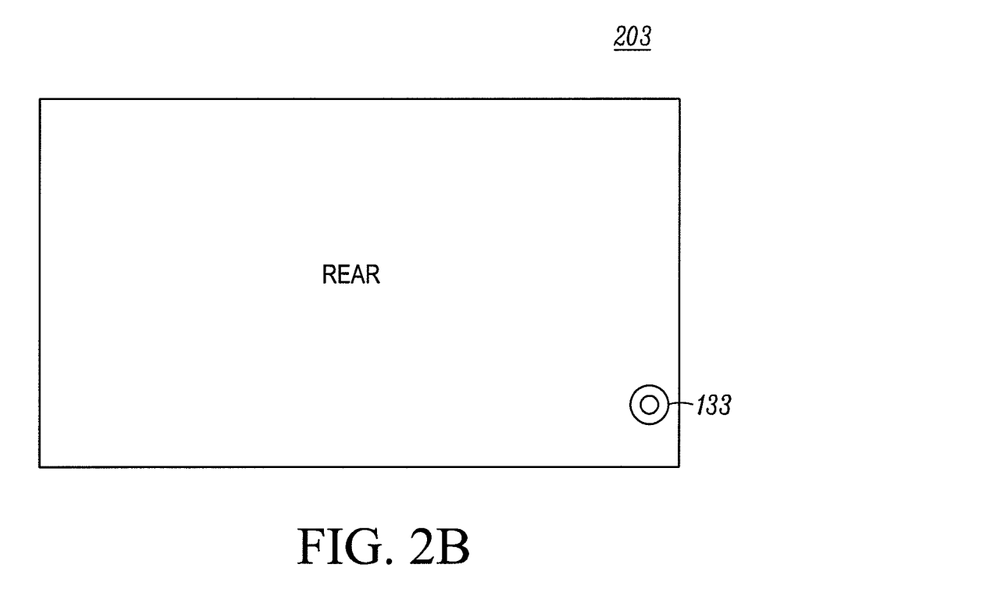
FIG. 2B is an example illustration of a back side of the mobile device of FIG. 1.

FIG. 2A is an illustration of a front side of mobile device 100. Camera 131 may be on a front side 201 where it may also be known as a front facing camera or alternate camera of mobile device 100. Mobile device 100 also shows a display 109, a microphone 120 and a speaker 122. A back or rear side 203 of mobile device is shown in FIG. 2B, where camera 133 is shown as a rear camera, and sometimes may be referred to as a main camera. In another embodiment of the invention, camera 131 and camera 133 exist in separate devices, such as cell phones, gaming devices, laptop computers, notebook computers, desktop computers, tablet computers or any portable or mobile computer system. In another embodiment of the invention, both camera 131 and camera 133 can be on the front side 201 of mobile device 100. Alternatively, both camera 131 and camera 133 may be located on the back side 203 of mobile device 100. In yet another embodiment of the invention, camera 131 may be a default rear camera located on the back side 203 of mobile device 100, while camera 133 can also be an alternative or default front camera on the front side 201 of mobile device 100.

Figure 2C:
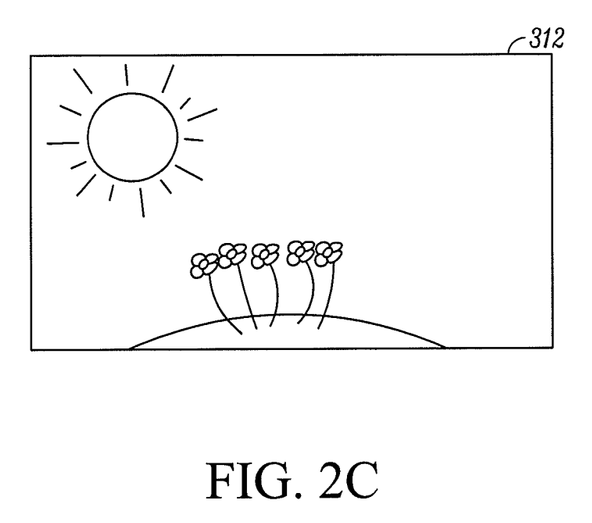
FIG. 2C is an example image of an object of a sun with flowers.

FIG. 2C illustratively shows a scenic image 312 that may be captured with image sensors and image processing communicatively coupled to either camera 131 or camera 133. While either camera may capture scene image 312, at any moment in time the other non-capturing camera performs as conventional camera hardware input button or selectable display screen icon for triggering the shutter or capture operation for the selected image capturing camera. That is one embodiment may employ a method of operating an image capturing device that has first and second camera lenses, whereby a first image is inputted or received into the image capturing device via the first camera lens. The image capturing device also employs a sensor for detecting a control gesture (such as a finger obstructing a camera lens) corresponding to the first image or alternatively corresponding to either first and second camera lenses. A camera operation can further be controlled with processing an image input associated also with the first image from the second camera lens in response to the detected control gesture. Hence, a comparison of input light entering the first and second camera lenses can be used as threshold levels for determining which camera, camera 131 or camera 133 will function as an input button to trigger image capture by the other available camera.

Figure 3:
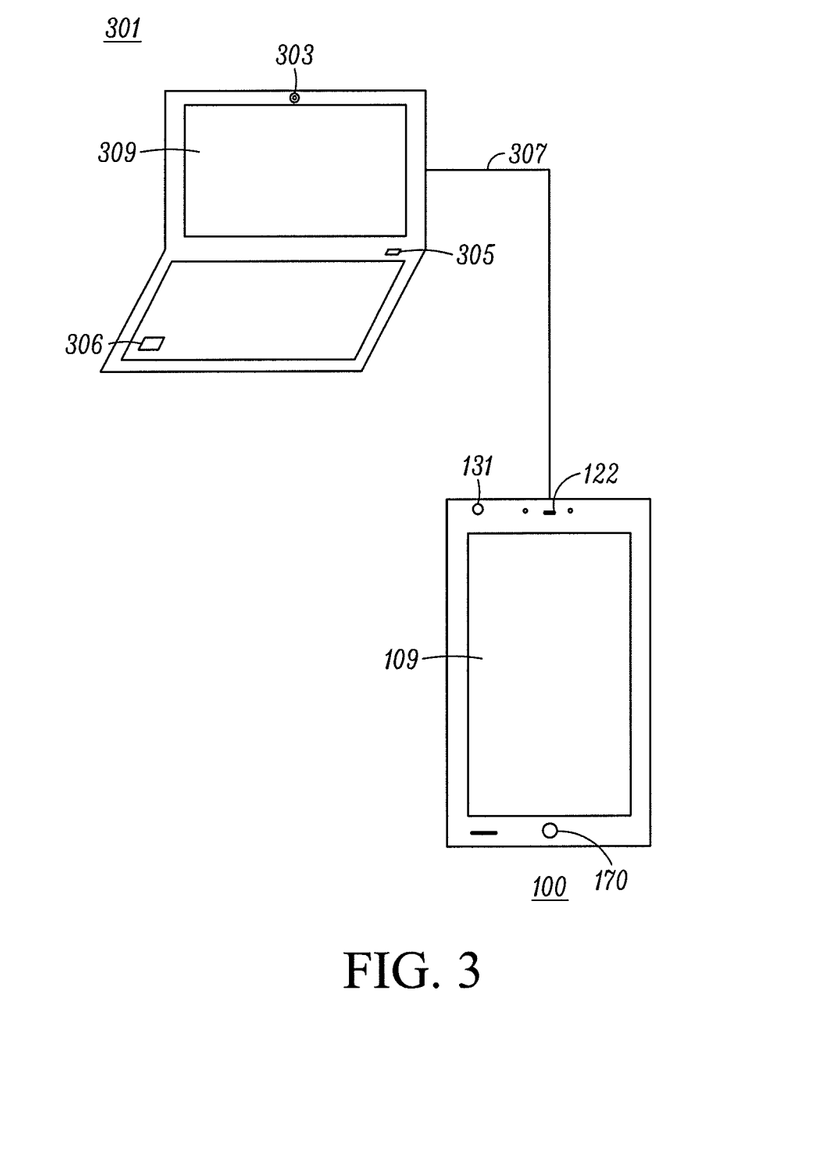
FIG. 3 is an illustration of a computer with the mobile device of FIG. 1.

FIG. 3 is an illustration of a computer 301 communicatively coupled or networked with the mobile device 100 of FIG. 1. Computer 301 is connected through a wire interface 307 with the mobile device 100. The wire interface 307 may be a USB cable or any other type of wire utilized to connect two or more computers or mobile devices, e.g., fiber optic, Ethernet, or Firewire. This computer 301 may also be wirelessly connected to mobile device 100. In another embodiment of the invention, wire interface 307 may be a wireless interface 307 that connects computer 301 to mobile device 100. Computer 301 is a typical computer that includes a connected or integrated computer camera 303 and a typical speaker 305 of the computer 301. Camera 303 may act as a co-working camera 133 with a main camera 131 on mobile device 100. Computer 301 also includes a computer display 309, e.g., capacitive or resistive touchscreen display; and a computer processor 306, for example dual or quad core processor.

Figure 4:
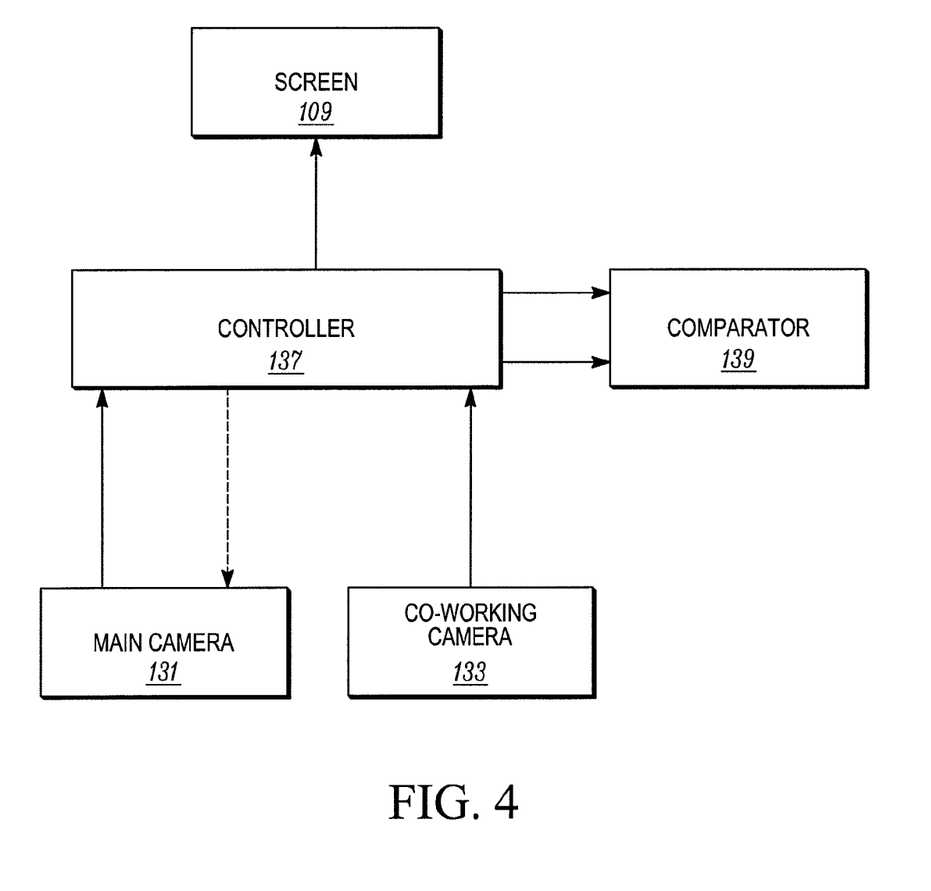
FIG. 4 is an example work flow chart.
Figure 5:
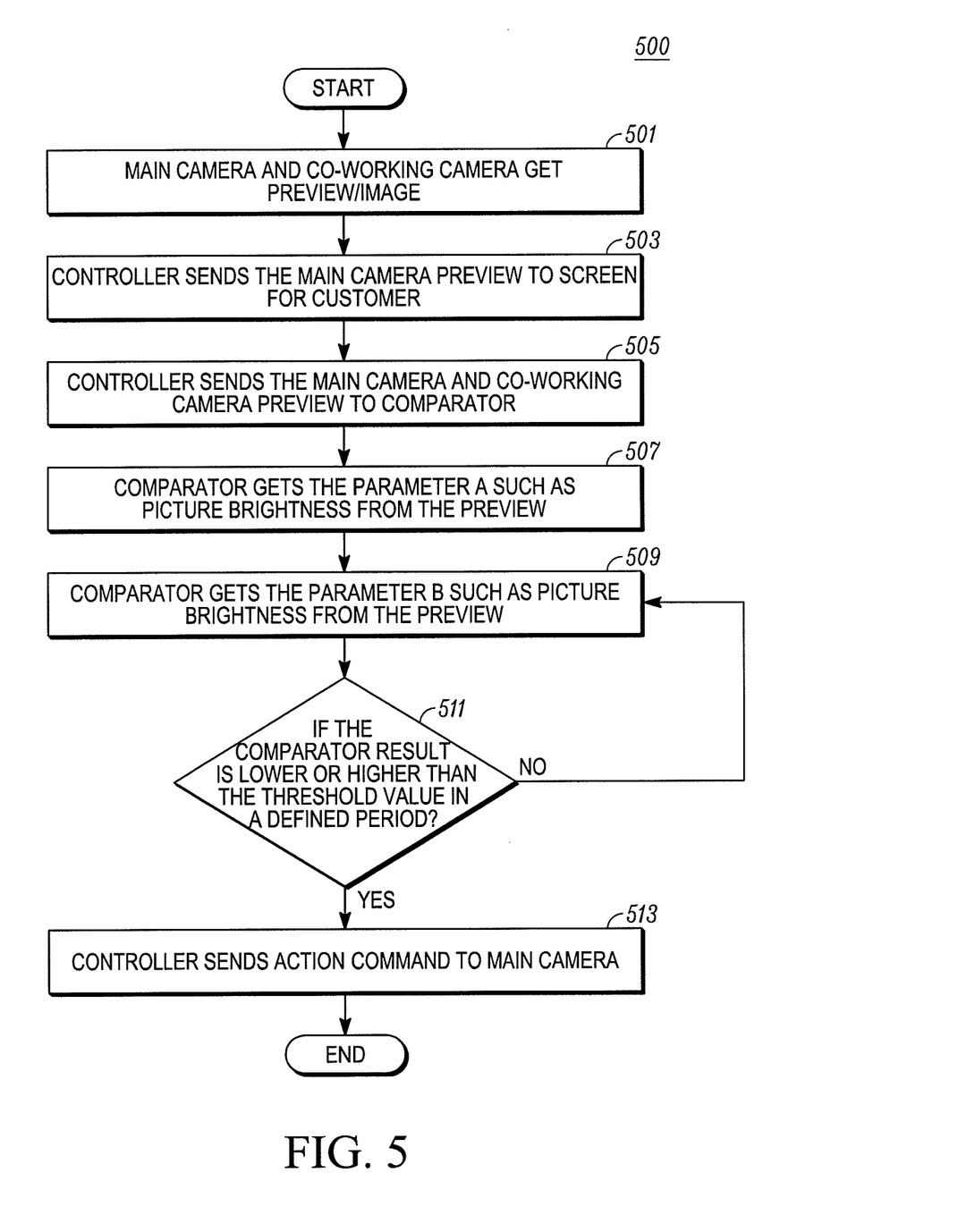
FIG. 5 is an example flow chart showing how cameras are utilized in the mobile device of FIG. 1.

FIG. 4 shows a work flow chart (in block diagram form) of the process in flow chart 500 shown in FIG. 5. The upward arrows from the main camera 131 and co-working camera 133 shows a first image and a second image being transferred by the controller 137 to the display/screen 109 for image display. A comparator 139 compares image sensor data (from a charge coupled device "CCD" or a complementary metal oxide semiconductor "CMOS", for example, incorporated within the camera or communicatively coupled to the camera) corresponding to main camera 131 and co-working camera 133. The image sensor data may include brightness levels, chroma, hue, saturation, lightness, and aperture opening values, or other image parameters, for example.

FIG. 5 is a flow chart 500 showing an example embodiment of how one or more cameras in the mobile device 100 function. At block 501, a person utilizes the mobile device 100 to take a picture of an object. The main camera 131 captures an image of the example object 312 (previously discussed and shown in FIG. 2C), while the co-working camera 133 also captures an image of the same object 312. At block 503 controller 137 sends the image from the main camera 131 and the image from the co-working camera 133 to the display 109.

At block 505 controller 137 transmits the image from the main camera 131 and the image from the co-working camera 133 to a comparator. At block 507, the comparator is able to obtain an image parameter "A" of the image from the main camera 131, hereinafter referred to as "first image" for illustrative discussion. Parameter A of the "first image" may be selected, for example, to include one of or a combination of a hue, chroma, saturation, luminance and brightness of the first image over a defined period of time. A working example for a defined threshold value is hue 130, saturation 30 and the luminance 100. Comparator 139 of FIG. 4 analyzes random selected number of points from the first image. The comparator 139 analyzes the first image of the main camera 131 and if the comparator 139 finds that the first image's value of hue is higher than 130, saturation is lower than 30 and the luminance is lower than 110 within a predetermined period of time, then the processor will assume a covered or obscured lens for camera 131 to thereafter, as an input function, force the controller 137 to capture a picture of an object utilizing co-working camera 133, instead of main camera 131. The predetermined period of time may be any time interval between 0 to 20 seconds, preferably the period of time is 1 second, but may be less subject to processor speed. Next, at block 509, comparator 139 is able to obtain a parameter "B" for a second image. The second image may have been captured by co-working camera 133, but need not necessarily be so. Parameter B of the second image includes a hue, chroma, saturation, luminance and brightness of the second image over the defined period of time. A working example for a defined threshold value is hue 130, saturation 30 and the luminance 100. Comparator 139 analyzes random selected number of points from the image captured by main camera 131, and if the comparator 139 determines that the second image includes ninety percent of its selected number of points and that the second image has a hue higher than 130, saturation lower than 30 and the luminance is lower than 110, then it will be assumed the lens of camera 131 was covered or obstructed to force the controller 137, in cooperation with the processor 103, to capture an image by utilizing co-working camera 133.

At block 511, comparator 139 analyzes parameter A of the first image with parameter B of the second image to determine if parameter A or parameter B is lower or higher than a predetermined threshold value for a defined period of time, resulting in, a defined threshold value. An example defined threshold value can be hue @130, saturation @30 and the luminance @100. If the threshold value for the parameter A or parameter B is not lower or higher than the defined threshold value, then the process returns to block 509. If the threshold value for the parameter A or parameter B is lower or higher than the defined threshold value, the process continues with the operation in block 513. At block 513, the controller 137 sends an action command to the camera that captured the image. For example, an action command is sent by controller 137 to transmit the first image from the main camera 131 to the processor 103, and subsequently to display 109. The defined period of time may be anywhere between 0-20 seconds, for example.

Figure 6:
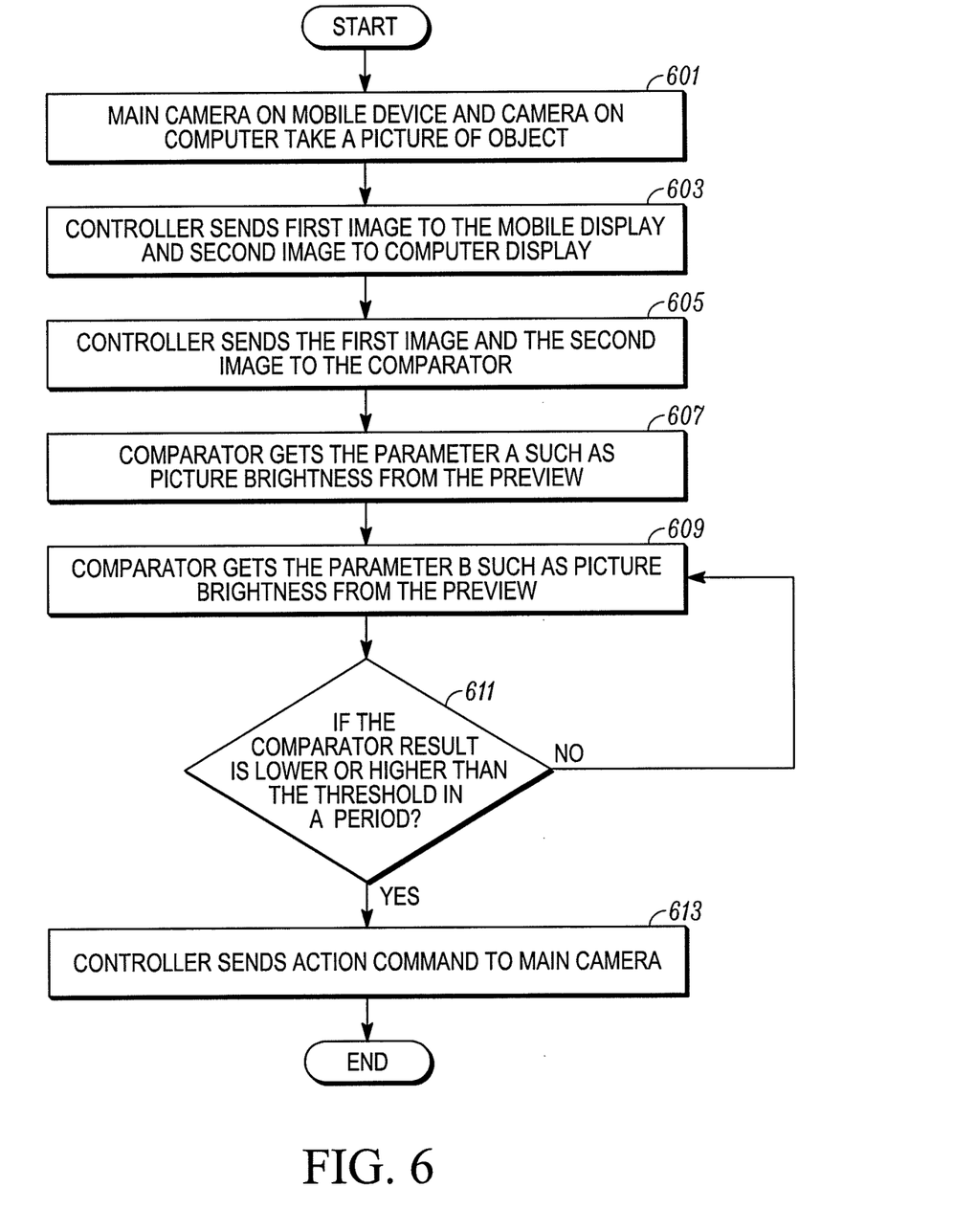
FIG. 6 is an example flow chart showing how cameras are utilized in the mobile device of FIG. 1 and the computer of FIG. 3.

FIG. 6 is a flow chart 600 showing how networked cameras are utilized with respect to mobile device 100 and computer 301 as shown in FIG. 3. At block 601, a person utilizes the mobile device 100 and computer 301 to take a picture of an object 312, (shown in FIG. 2C illustratively as an image of a sun shining on flowers). In other embodiments of the invention, the object can be any image, such as an image including planetary objects, animals, people, picturesque nature views or any image a person can think of capturing. Referring again to FIG. 6, the mobile device camera 131 takes a first image of the object 312, and the computer camera 303 takes a second image of the same object 312. Next, at block 603, controller 137 sends the first image of the object 312 from camera 131 to the display 109 while the processor of computer 301 sends the second image of the object 312 from camera 303 to the computer display 309.

At block 605 in FIG. 6, controller 137 transmits the image from camera 131 of mobile device 100 and the image from camera 303 to the comparator 139 in the mobile device 100. At block 607, comparator 139 is able to obtain at least one parameter A of the image from camera 131. Parameter A of the image includes a hue, chroma, saturation, luminance and brightness of a first captured image over a defined period of time. A threshold value may have a range of 50-150 hue, saturation of 10-40, and a luminance of 60-150. In one embodiment of the invention, the defined threshold value is hue 130, saturation is 30 and the luminance is 100. Comparator 139 (shown in FIG. 7) analyzes random selected number of image pixels from the first captured image corresponding to camera 131. The comparator 139 analyzes the first image and if the comparator 139 finds that the first image contains 90% of pixels having hue higher than 130, saturation lower than 30 and luminance lower than 110 over a defined period of time, then it will be assumed, for example, that a customer covered a lens of camera 131 to force the controller 137 to recognize the action as a gesture input and enable capture of a picture or image of an object by camera 303. The defined period of time can be anywhere between 0 to 20 seconds. Preferably the period of time is 1 second, but may be less depending on processor speed. Next, at block 609, comparator 139 is able to obtain at least one parameter B of the image captured by camera 303, i.e., the "second" image. Parameter B corresponding to a second image includes a hue, chroma, saturation, luminance and brightness of the second image over the defined period of time. A threshold value may have a range of 50-150 hue, saturation of 10-40, and a lumination of 60-150. In one embodiment of the invention, the defined threshold value is hue 130, saturation is 30 and the luminance is 100. Comparator 139 analyzes random selected number of image pixels from the image captured by camera 303. The comparator 139 analyzes the image from camera 303 and if the comparator 139 determines that the image has 90% of its pixels having a hue higher than 130, saturation lower than 30 and luminance lower than 110 for a predetermined period of time, then it will be assumed that the customer covered the lens of camera 303 with a gesture input to force the controller 137 to capture a picture or image by utilizing camera 131.

At block 611, comparator 139 analyzes parameter A of a first image (captured by camera 131) with parameter B of a second image (captured by camera 303) to determine whether a value for parameter A or parameter B is lower or higher than a predetermined threshold value for a defined period of time resulting in a defined threshold value. The defined period may be any time interval between 0-20 seconds. A working example of a threshold value can be hue 130, saturation 30 and luminance 100. If the threshold value for the parameter A or parameter B is not lower or higher than the defined threshold value, then the process returns to block 609. If the threshold value for the parameter A or parameter B is lower or higher than the defined threshold value then the process goes to block 613. At block 613, the controller 139 transmits the first image from camera 131 to processor 103, and then displays the image on display 109.

Figure 7:
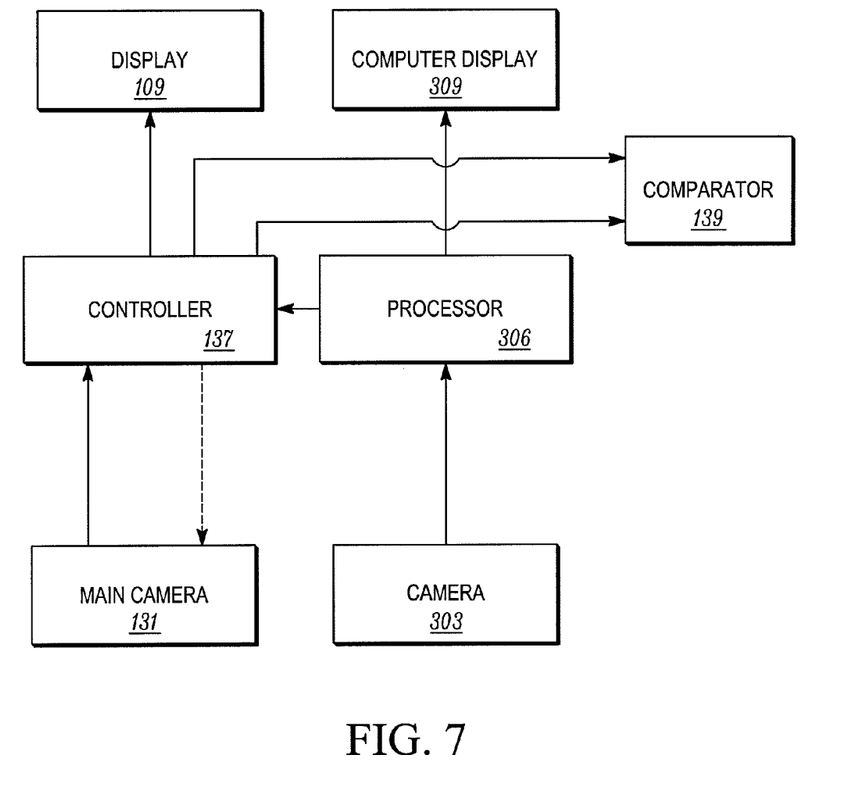
FIG. 7 is an example work flow chart of the operation of the flow chart of FIG. 6.

FIG. 7 shows a work flow chart of the operation of flow chart of FIG. 6. The upward arrows from camera 131 of mobile device 100 shows the first image transferred from the controller 137 to the display/screen 109. Also, the upward arrows from camera 303 of the computer 301 shows the second image transferred from the computer 301 and processor 306 through the wire interface 307 to the controller 137 and processor 306. The processor 306 transfers the second image to the computer display 309.

This disclosure illustratively shows a portable device comprising a housing that includes, for example, a first camera opening in the housing; and a second camera opening in the housing. At least one imager is coupled to the first and second camera openings. The imager is configured for capturing a first image associated with an objected viewed through the first camera opening and a second image associated with an object viewed through said second camera opening. A processor coupled to the at least one imager is configured to detect a gesture over one of the first and second camera openings, and thereafter respond to the detected gesture to control image processing of either the first or second images.

Although specific embodiments have been described above, many modifications and variations can be made as will be obvious to those of ordinary skill in the art, without departing from the scope as set forth in the following claims.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more, unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Likewise, computer-readable storage medium can comprise a non-transitory machine readable storage device, having stored thereon a computer program that include a plurality of code sections for performing operations, steps or a set of instructions.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of operating a device having at least first and second camera lenses, comprising:
    inputting a first image via the first camera lens;
    detecting from processing said first image a control gesture over the first camera lens; and
    controlling an operation associated with processing an image input from the second camera lens in response to the detected control gesture from the first image.

2. The method of claim 1, wherein detecting a control gesture includes detecting a finger over the first camera lens.

3. The method of claim 1 further comprising automatically sampling an exposure time associated with the first camera lens to automatically find focus for the second camera lens.

4. The method of claim 1 further comprising automatically sampling a brightness level associated with the first camera lens to automatically initiate shutter or capture operation for the second camera lens.

5. The method of claim 1, further comprising automatically switching an image capture function from the second camera lens to the first camera lens based on automatically sampling a brightness level associated with the first camera lens.

6. The method of claim 1, further comprising automatically switching an input trigger function from the first camera lens to the second camera lens based on automatically sampling a brightness level associated with the first camera lens.

7. The method of claim 1, wherein the first image includes elements selected from a group consisting of hue, chroma, saturation, luminance and brightness.

8. The method of claim 1, wherein the second image includes elements selected from a group consisting of hue, chroma, saturation, luminance and brightness.

9. A method of operating a device having at least first and second camera lenses, comprising:
    inputting a first scene image via the first camera lens;
    inputting a second scene image via the second camera lens;
    detecting, from said first and second scene images, a control gesture over a one of the first and second camera lenses and the corresponding one of said first and second camera lenses associated with said detected control gesture; and
    controlling an operation associated with processing an image input from the other of said first and second camera lenses in response to the detected control gesture.

10. The method claimed in claim 9, wherein the detected control gesture is a finger over either the first or second camera lens.

* * * * *